(12) United States Patent
Gkoulalas-Divanis

(10) Patent No.: US 11,762,835 B2
(45) Date of Patent: *Sep. 19, 2023

(54) ADAPTIVE STATISTICAL DATA DE-IDENTIFICATION BASED ON EVOLVING DATA STREAMS

(71) Applicant: International Business Machines Corporation, Armonk, NY (US)

(72) Inventor: Aris Gkoulalas-Divanis, Waltham, MA (US)

(73) Assignee: International Business Machines Corporation, Armonk, NY (US)

(*) Notice: Subject to any disclaimer, the term of this patent is extended or adjusted under 35 U.S.C. 154(b) by 8 days.

This patent is subject to a terminal disclaimer.

(21) Appl. No.: 17/370,277

(22) Filed: Jul. 8, 2021

(65) Prior Publication Data

US 2021/0334261 A1    Oct. 28, 2021

Related U.S. Application Data

(63) Continuation of application No. 15/848,061, filed on Dec. 20, 2017, now Pat. No. 11,151,113.

(51) Int. Cl.
*G06F 16/23* (2019.01)
*G06F 11/34* (2006.01)
(Continued)

(52) U.S. Cl.
CPC .......... *G06F 16/23* (2019.01); *G06F 11/3476* (2013.01); *G06F 17/18* (2013.01); *G06F 21/6254* (2013.01); *G06N 20/00* (2019.01)

(58) Field of Classification Search
CPC .. G06F 11/3476; G06F 17/18; G06F 21/6254; G06F 16/23; G06N 20/00
See application file for complete search history.

(56) References Cited

U.S. PATENT DOCUMENTS

2002/0073138 A1* 6/2002 Gilbert ............... G16Z 99/00
709/201
2010/0042583 A1* 2/2010 Gervais .............. G06Q 40/08
707/E17.014

(Continued)

FOREIGN PATENT DOCUMENTS

CN    103201748 A    7/2013
CN    104956390 A    9/2015
(Continued)

OTHER PUBLICATIONS

PCT International Search Report and the Written Opinion of the International Searching Authority, PCT/IB2018/060182, dated Apr. 24, 2019, 9 pages.
(Continued)

*Primary Examiner* — Yuk Ting Choi
(74) *Attorney, Agent, or Firm* — Edell, Shapiro & Finnan, LLC

(57) ABSTRACT

A system dynamically changes a data de-identification ruleset applied to a dataset for de-identifying data and comprises at least one processor. The system periodically monitors a dataset derived from data that is de-identified according to a data de-identification ruleset under a set of conditions. The set of conditions for the data de-identification ruleset is evaluated with respect to the monitored data to determine applicability of the data de-identification. One or more rules of the data de-identification ruleset are dynamically changed in response to the evaluation indicating one or more conditions of the set of conditions for the data de-identification ruleset are no longer satisfied. Embodiments of the present invention may further include a method and computer program product for dynamically changing a data de-identification ruleset applied to a dataset for de-identifying data in substantially the same manner described above.

24 Claims, 5 Drawing Sheets

(51) Int. Cl.
*G06F 17/18* (2006.01)
*G06F 21/62* (2013.01)
*G06N 20/00* (2019.01)

(56) References Cited

U.S. PATENT DOCUMENTS

| | | | |
|---|---|---|---|
| 2012/0131481 A1 | 5/2012 | Gupta et al. | |
| 2012/0151597 A1* | 6/2012 | Gupta | G06F 21/6254 726/26 |
| 2016/0019388 A1* | 1/2016 | Singla | G06F 21/552 726/23 |
| 2016/0307063 A1* | 10/2016 | Bright | G16H 30/40 726/26 |
| 2016/0342636 A1 | 11/2016 | Braghin et al. | |
| 2017/0177907 A1 | 6/2017 | Scaiano et al. | |
| 2019/0080063 A1* | 3/2019 | Rice | G06N 5/003 726/26 |
| 2019/0188292 A1 | 6/2019 | Gkoulalas-Divanis | |

FOREIGN PATENT DOCUMENTS

| | | |
|---|---|---|
| CN | 106471506 A | 1/2017 |
| CN | 107301350 A | 10/2017 |

OTHER PUBLICATIONS

List of IBM Patents or Patent Applications Treated as Related, Jul. 8, 2021, 1 page.
First Office Action with English translation in Chinese Application No. 201880073071.0, dated Apr. 15, 2023, 22 pages.

\* cited by examiner

ADAPTIVE STATISTICAL DATA DE-IDENTIFICATION BASED ON EVOLVING DATA STREAMS

BACKGROUND

1. Technical Field

Present invention embodiments relate to data access, and more specifically, to dynamically adapting data de-identification in data streams.

2. Discussion of the Related Art

Data de-identification is a process of transforming values in datasets to protect personally identifiable information, where there is no reasonable basis to believe that the information remaining in the dataset can be used to re-identify individuals.

Under the US Health Insurance Portability and Accountability Act of 1996 (HIPAA), acceptable ways for de-identifying a dataset pertaining to personal health information include using a Safe Harbor list, and using expert determination. Each of these mainly rely on data de-identification rulesets to offer data protection. Other legal privacy frameworks adopt a similar approach by considering the application of a data de-identification ruleset to original data values of a dataset in order to protect personal data.

The data de-identification rulesets are usually: constructed by following population density/population uniqueness criteria; based on distribution of the data (e.g., data involving citizens of a certain region); and based on a possibility of successful triangulation attacks against publicly available datasets (e.g., census data, yellow pages, deaths reported in obituaries, open data, etc.).

Each of these criteria that are used to derive the data de-identification rules for protecting a dataset are based on information that may change at any point in time, thereby leaving a previously sufficiently de-identified dataset (given a particular data de-identification ruleset) susceptible to new re-identification and sensitive information disclosure attacks.

A reason that data de-identification rules may become insufficient to protect individuals' privacy is that the data de-identification rules are static. In other words, the data de-identification rules are derived by privacy experts based on their knowledge of the then (i.e., at the point they examined the dataset) publicly available information, the then data contained in the dataset, and the then validity of various assumptions pertaining to the perceived power of attackers (i.e., considered background knowledge that attackers may have in order to breach data privacy). All of these assumptions that were reasonable at the time the domain experts evaluated the privacy level in the dataset after the application of their prescribed de-identification rules, can be invalidated at any point later in time, rendering the data vulnerable to new privacy attacks.

Although expert determinations are accompanied by an expiration date (usually 2-3 years), the expiration date is calculated in terms of years and there is no guarantee that the prescribed data de-identification rules will not become outdated based on data and knowledge changing in the interim. Since many open data initiatives exist worldwide, this may lead to a plethora of datasets becoming available online and existing datasets being updated with newer information. Thus, it becomes increasingly easier for attackers to breach the privacy offered by static data de-identification rules in person-specific datasets.

SUMMARY

According to one embodiment of the present invention, a system dynamically changes a data de-identification ruleset applied to a dataset for de-identifying data and comprises at least one processor. The system periodically monitors a dataset derived from data that is de-identified according to a data de-identification ruleset under a set of conditions. The set of conditions for the data de-identification ruleset is evaluated with respect to the monitored data to determine applicability of the data de-identification. One or more rules of the data de-identification ruleset are dynamically changed in response to the evaluation indicating one or more conditions of the set of conditions for the initial data de-identification ruleset are no longer satisfied. An embodiment of the present invention may further dynamically change one or more rules of the data de-identification ruleset based on machine learning. Embodiments of the present invention may further include a method and computer program product for dynamically changing a ruleset applied to a dataset for de-identifying data in substantially the same manner described above.

This provides a mechanism that continuously (e.g., in real time) or periodically evaluates the validity of assumptions made by a statistical expert, and adapts the data de-identification rules as necessary in order to maintain a high level of privacy protection. The data de-identification may be adapted based on machine learning to provide a cognitive and intelligent adaptation of the data de-identification. In other words, the mechanism maintains a re-identification risk below an acceptable threshold, usually based on the applicable privacy requirements and legal frameworks (e.g., HIPAA Safe Harbor, etc.).

An embodiment of the present invention may further dynamically change one or more rules of the data de-identification ruleset by replacing the data de-identification ruleset with a new data de-identification ruleset selected from among a group of data de-identification rulesets based on the evaluation, wherein conditions of the new data de-identification ruleset are satisfied. The set of applicable data de-identification rulesets and corresponding conditions for their validity may be prescribed by the domain/statistical expert as part of the original expert determination performed on the dataset. In this case, the domain/statistical expert provides a determination that corresponds to a set of data de-identification rulesets and the respective conditions for their validity, thereby capturing a variety of scenaria related to changes that may happen in the future (e.g., changes to the data distribution, changes to external datasets, etc.), causing changes to the determination that he or she would provide, and the corresponding mitigation strategies (i.e., data de-identification rulesets) for offering sufficient privacy protection of the data. This ensures that the data de-identification can be dynamically adapted based on the monitored data changes (e.g., in real time) in a manner that preserves privacy as the dataset changes over time.

An embodiment of the present invention may further replace the data de-identification ruleset with the new data de-identification ruleset in response to a change in a threshold of a data de-identification rule in the data de-identification ruleset. This enables an appropriate data de-identification ruleset to be dynamically selected based on monitored data changes (e.g., in real time) to maintain privacy in view of dataset changes.

An embodiment of the present invention may prevent release of the de-identified data in response to the evaluation indicating one or more conditions for each data de-identification ruleset of the group are not satisfied. This prevents release of potentially vulnerable data when data de-identification processes are insufficient to protect the changed data. The processing of de-identification may further be terminated (e.g., until a proper data de-identification ruleset can be identified, etc.) in order to preserve computing resources and efficiency.

BRIEF DESCRIPTION OF THE DRAWINGS

Generally, like reference numerals in the various figures are utilized to designate like components.

DETAILED DESCRIPTION

Figure 1:
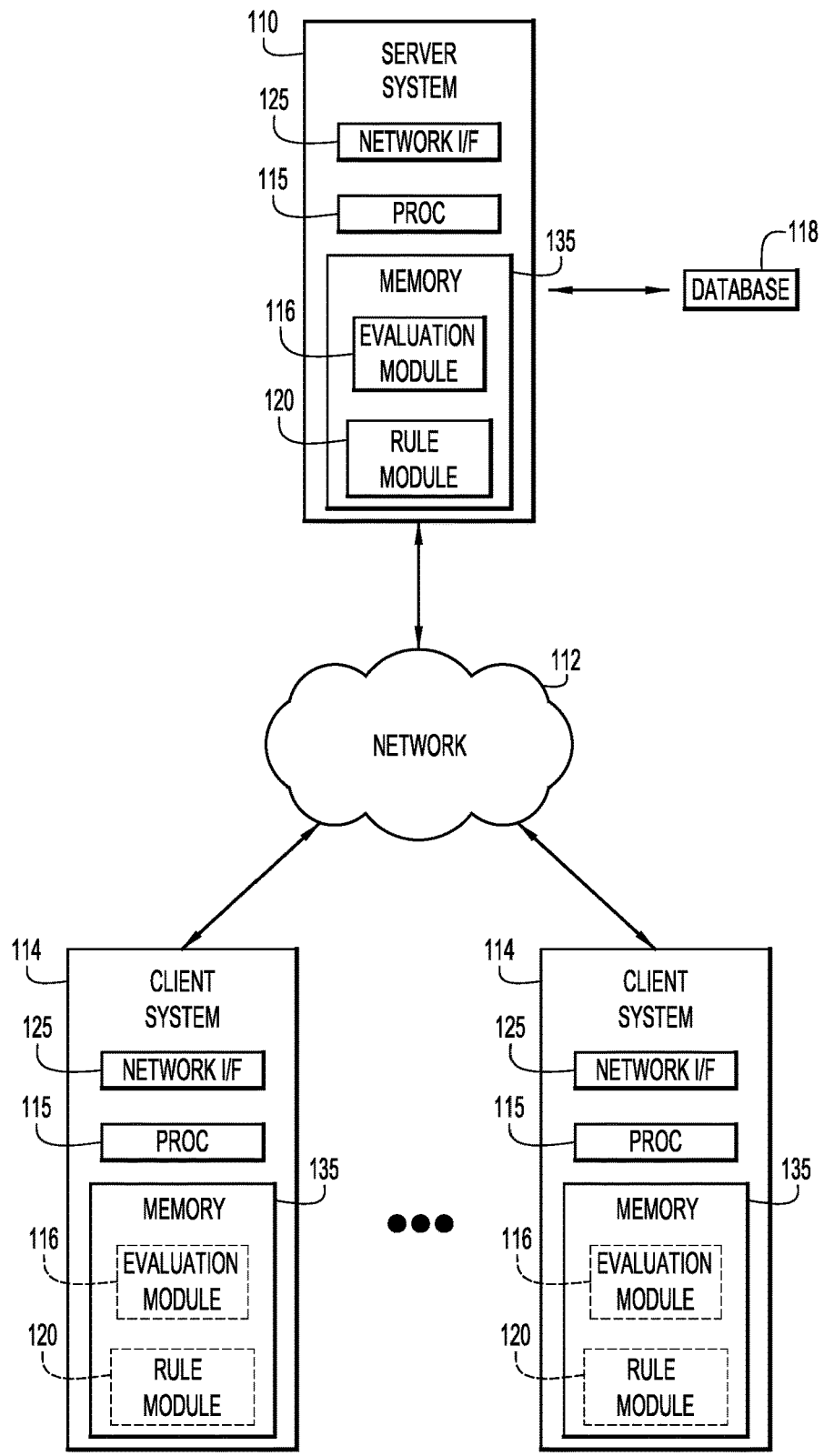
FIG. 1 is a diagrammatic illustration of an example computing environment of an embodiment of the present invention.

Present invention embodiments pertain to automated, periodic re-evaluation of a data de-identification ruleset over a dataset (or data stream) with respect to an ability of the data de-identification ruleset to offer sufficient data de-identification (compliant with data de-identification requirements of laws, policies, standards, etc.). Present invention embodiments dynamically transit from a current data de-identification ruleset for data de-identification to another (expert-provided) data de-identification ruleset, when the current data de-identification ruleset is no longer offering sufficient privacy protection. Present invention embodiments may be used to support expert determinations that offer a much higher level of data protection than existing ones. This eliminates a need to revise the expert determination every 1-2 years, and ensures that the applied data de-identification rules will not become outdated and leave the data vulnerable to privacy attacks.

Static data de-identification rules prescribed over dynamically evolving datasets (or data streams) may easily become outdated leaving the datasets vulnerable to re-identification and sensitive information disclosure attacks.

A present invention embodiment provides a mechanism to continuously (e.g., in real time) or periodically (preferably in short periods of time (e.g., every few weeks, etc.)) monitor a dataset and re-evaluate appropriateness of enforced data de-identification rules toward sufficiently protecting privacy of individuals represented in the dataset. This mechanism automatically (and dynamically) changes the data de-identification ruleset that is applied to the dataset in order to adapt to new conditions that invalidate the effectiveness of the prior data de-identification ruleset.

The mechanism supports and evaluates a variety of conditions considered by statistical or other experts or users. These evaluations and conditions may include: performing probabilistic, online/on-the-fly linkage of a record from the dataset against an external dataset, leading to a matching score that denotes a probability of a successful triangulation/re-identification attack; retrieving statistics from multiple external, publicly available datasets that allows for deriving current population uniqueness criteria, such as information about population density in certain geolocations; evaluating and determining correlations that may exist between attributes of the dataset, giving rise to sensitive information disclosure attacks and enabling indirect re-identifications (when a data value is missing or noisy); and modeling and determining significant changes to data distributions (e.g., population distribution used in a data analysis for the expert determination, the distribution of the dataset that was evaluated for protection, etc.) that can evaluate the applicability of the currently enforced data de-identification ruleset.

A present invention embodiment provides a mechanism that continuously (e.g., in real time) or periodically evaluates validity of assumptions made by a statistical expert, and adapts the data de-identification rules as necessary in order to maintain a high level of privacy protection. The data de-identification may be adapted based on machine learning to provide a cognitive and intelligent adaptation of the data de-identification. In other words, the mechanism maintains a re-identification risk below an acceptable threshold, usually based on the applicable privacy requirements and legal frameworks (e.g., HIPAA Safe Harbor, etc.).

An embodiment of the present invention may further dynamically change one or more rules of the data de-identification ruleset by replacing the data de-identification ruleset with a new data de-identification ruleset selected from among a group of data de-identification rulesets based on the evaluation, wherein conditions of the new data de-identification ruleset are satisfied. This ensures that the data de-identification is dynamically adapted based on monitored data changes (e.g., in real time) in a manner to preserve privacy as the dataset changes over time.

An embodiment of the present invention may further replace the data de-identification ruleset with the new data de-identification ruleset in response to a change in a threshold of a data de-identification rule in the data de-identification ruleset. This enables an appropriate data de-identification ruleset to be dynamically selected based on monitored data changes (e.g., in real time) to maintain privacy in view of dataset changes.

An embodiment of the present invention may prevent release of de-identified data in response to the evaluation indicating one or more conditions for each data de-identification ruleset of the group not being satisfied. This prevents release of potentially vulnerable data when data de-identification processes or techniques are insufficient to protect the changed data. The processing of de-identification may further be terminated (e.g., until a proper data de-identification ruleset can be identified, etc.) in order to preserve computing resources and efficiency.

An example environment for use with present invention embodiments is illustrated in FIG. 1. Specifically, the environment includes one or more server systems 110, and one or more client or end-user systems 114. Server systems 110 and client systems 114 may be remote from each other and communicate over a network 112. The network may be implemented by any number of any suitable communications media (e.g., wide area network (WAN), local area network (LAN), Internet, Intranet, etc.). Alternatively, server systems 110 and client systems 114 may be local to each other, and communicate via any appropriate local communication medium (e.g., local area network (LAN), hardwire, wireless link, Intranet, etc.).

Client systems 114 enable users to interact with server systems 110 to perform desired actions, such as data de-identification. The server systems include an evaluation module 116 to monitor compliance of changing data with a current or active data de-identification ruleset, and a rule module 120 to dynamically modify the data de-identification ruleset based on the evaluation. A database system 118 may store various information for the analysis (e.g., original and changed datasets, thresholds, data de-identification rulesets, etc.). The database system may be implemented by any conventional or other database or storage unit, may be local to or remote from server systems 110 and client systems 114, and may communicate via any appropriate communication medium (e.g., local area network (LAN), wide area network (WAN), Internet, hardwire, wireless link, Intranet, etc.). The client systems may present a graphical user (e.g., GUI, etc.) or other interface (e.g., command line prompts, menu screens, etc.) to solicit information from users pertaining to the analysis, and may provide reports including analysis results (e.g., recommended data de-identification rulesets, de-identified datasets, invalid conditions, data de-identification ruleset evaluation results, etc.).

Server systems 110 and client systems 114 may be implemented by any conventional or other computer systems preferably equipped with a display or monitor, a base, optional input devices (e.g., a keyboard, mouse or other input device), and any commercially available and custom software (e.g., server/communications software, evaluation module, rule module, browser/interface software, data de-identification processes to de-identify data according to data de-identification rulesets, condition evaluation processes to evaluate conditions of data de-identification rulesets, etc.). The base preferably includes at least one hardware processor 115 (e.g., microprocessor, controller, central processing unit (CPU), etc.), one or more memories 135 and/or internal or external network interfaces or communications devices 125 (e.g., modem, network cards, etc.)).

Alternatively, one or more client systems 114 may dynamically adjust data de-identification when operating as a stand-alone unit. In a stand-alone mode of operation, the client system stores or has access to the data (e.g., original and changed datasets, thresholds, data de-identification rulesets, data de-identification processes, condition evaluation processes, etc.), and includes evaluation module 116 to perform the data de-identification ruleset evaluation and rule module 120 to modify a data de-identification ruleset based on the evaluation. The graphical user (e.g., GUI, etc.) or other interface (e.g., command line prompts, menu screens, etc.) solicits information from a corresponding user pertaining to the analysis, and may provide reports including analysis results.

Evaluation module 116 and rule module 120 may include one or more modules or units to perform the various functions of present invention embodiments described below. The various modules (e.g., evaluation module, rule module, data de-identification processes, condition evaluation processes, etc.) may be implemented by any combination of any quantity of software and/or hardware modules or units, and may reside within memory 135 of the server and/or client systems for execution by processor 115.

A dataset may originate from an evolving (e.g., in real time) data stream that is sufficiently de-identified using a data de-identification ruleset under corresponding conditions. The data de-identification ruleset is selected from a set or group of potential data de-identification rulesets and associated conditions. An embodiment of the present invention continuously (e.g., in real time) or periodically monitors the data stream to re-evaluate the corresponding conditions of a currently enforced data de-identification ruleset, and changes the current data de-identification ruleset when corresponding conditions are not satisfied. The conditions may be examined by condition evaluation processes that evaluate and quantify a number of data characteristics against thresholds pre-specified by a data expert or other user.

Figure 2:
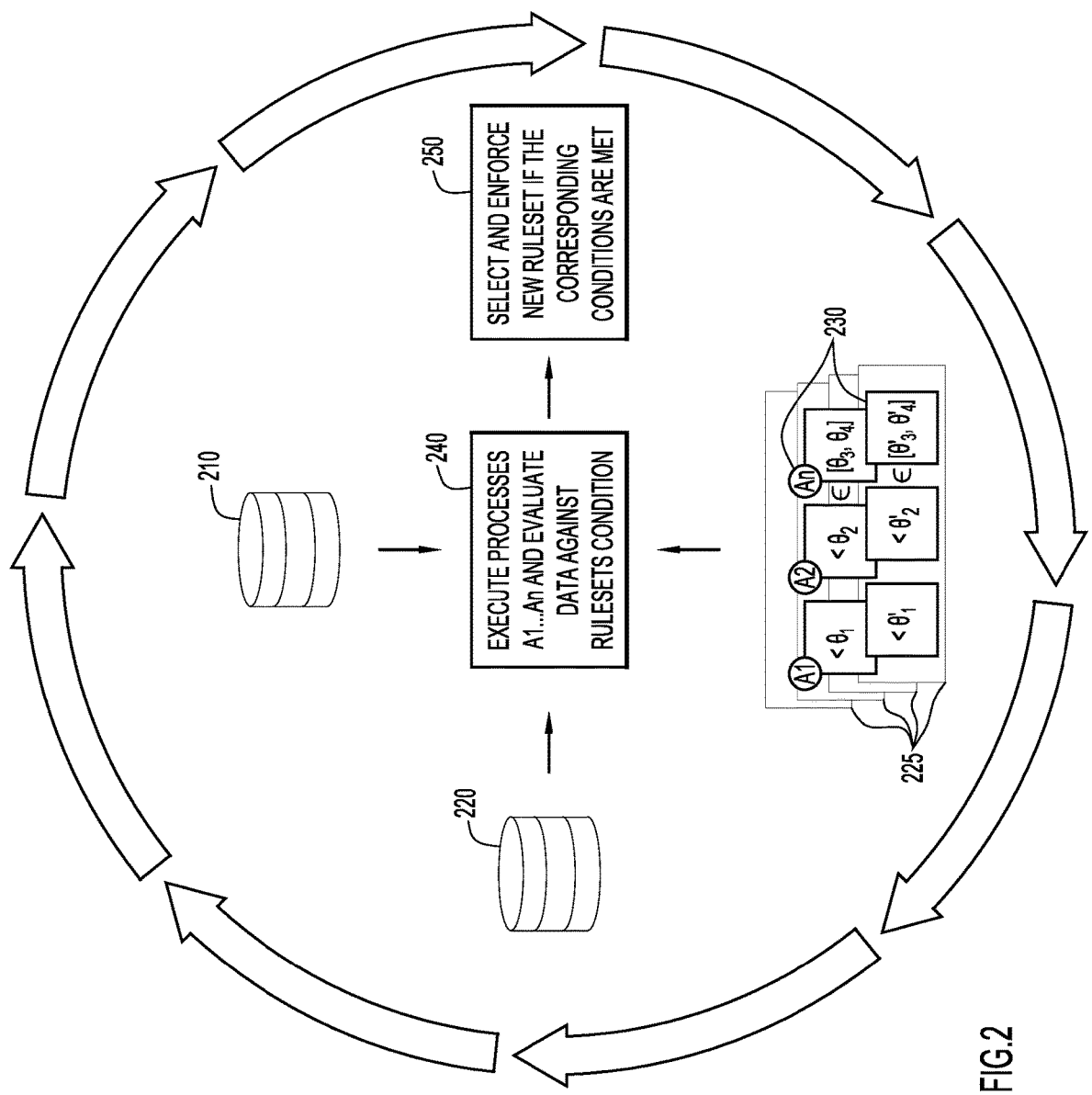
FIG. 2 is a flow diagram illustrating a manner of dynamically adjusting data de-identification based on changes in a dataset according to an embodiment of the present invention.

A manner of dynamically altering a data de-identification ruleset for a data de-identification process based on changing data (e.g., via evaluation module 116, rule module 120, and a server system 110 and/or client system 114) according to an embodiment of the present invention is illustrated in FIG. 2. Specifically, a data owner or other user defines a group or set of data de-identification rulesets 225 each associated with one or more corresponding conditions 230. The data de-identification rulesets each include one or more rules indicating a manner of de-identifying data in accordance with de-identification requirements (e.g., of laws, policies, standards, etc.), while the conditions indicate when each of the rules of a data de-identification ruleset 225 should be enforced on incoming data records of a dataset 210. Each condition 230 may be evaluated based on execution of a corresponding condition evaluation process. An active data de-identification ruleset 225 is initially employed for data de-identification of dataset 210.

For example, a ruleset 500 (FIG. 5) for an example dataset 210 may include rules 510 specifying manners of data de-identification in accordance with data de-identification requirements (e.g., of laws, policies, standards, etc.) and conditions 520 indicating the conditions when rules 510 are applied to de-identify data. By way of example, the dataset may be in the form a table with each row corresponding to an individual or entity and columns specifying attributes of date of birth (DOB), gender, zip code, and diagnosis codes. Conditions 520 reflect a state of a dataset (e.g., data characteristics and/or statistics, etc.) when rules 510 were established so that the rules de-identify the dataset in compliance with data de-identification requirements. When the conditions are no longer satisfied, the data de-identification provided by the rules may not comply with the data de-identification requirements.

By way of example, rules 510 may include a rule 512 to de-identify or generalize the date of birth of each individual in the data to the corresponding month and year, a rule 514 to mask the initial three digits of zip code to "000", and a rule 516 which basically provides no data de-identification for the diagnosis codes. By way of further example, conditions 520 may include a condition 522 requiring the probability of successful linkage of de-identified data to data of external data stores 525 to be less than or equal to one out of three (or 33.3%), a condition 524 requiring a population density of less than 20,000 individuals in the zip code based on the most recent census data, and a condition 526 requiring that the dataset contains no diagnosis (ICD) codes x, y, or r. When all these conditions are satisfied, the rules in this data de-identification ruleset 500 provide sufficient data de-identification that is in compliance with data de-identification requirements (e.g., for considered laws, policies, standards, etc.)

Referring back to FIG. 2, a dataset 220 preferably arrives in a stream fashion or dynamically changes over time, and conditions 230 of active data de-identification ruleset 225 are periodically (e.g., every week, etc.) evaluated over dataset 220 at flow 240. Alternatively, incoming data may be constantly monitored (e.g., in real time) and evaluation of active data de-identification ruleset 225 may be initiated in response to sufficient changes to the dataset (e.g., changes in types of attributes, changes in quantity, frequency, uniqueness, etc. of data attributes, etc.). Dataset 220 may be de-identified according to data de-identification rules of active data de-identification ruleset 225 in order to perform the evaluation, depending upon the types of corresponding conditions 230.

Evaluation module 116 executes condition evaluation processes corresponding to conditions 230 of active data de-identification ruleset 225, where each condition evaluation process preferably determines a numeric value or score. The determined score is compared to a threshold, preferably set by a user (e.g., data de-identification expert, etc.) to determine compliance with a corresponding condition 230. When each condition 230 of active data de-identification ruleset 225 is satisfied, the active data de-identification ruleset is enforced at flow 250.

When one or more conditions 230 of active data de-identification ruleset 225 are not satisfied by dataset 220, rule module 120 adjusts the data de-identification ruleset for satisfaction of corresponding conditions 230 at flow 250. This may be accomplished by modifying the rules and/or conditions of active data de-identification ruleset 225 to satisfy the conditions, or replacing the active data de-identification ruleset with a new data de-identification ruleset having corresponding conditions 230 satisfied by dataset 220. A new data de-identification ruleset may alternatively be enforced based on a delta change (δ) to a threshold (θ) of a data de-identification rule belonging to the active data de-identification ruleset (e.g., θ+δ), instead of conformance to a strictly specified threshold in the new data de-identification ruleset.

The rule module may further generate and provide one or more notifications to the data owner when the active data de-identification ruleset is no longer applicable to indicate replacement by a modified (e.g., rules and/or conditions) or new data de-identification ruleset. A data de-identification ruleset identification (e.g., a CertificateID, etc.) may be updated to indicate the modified or new data de-identification ruleset, and used for auditing purposes.

Efficient data structures and/or online/incremental/stream data processing techniques (e.g., applicable to Big Data, etc.) may be utilized to enhance performance and quicken computations for evaluating the various conditions in order to identify the data de-identification ruleset to be enforced on dataset 220.

In addition, a fallback or default data de-identification ruleset may be defined when the conditions of no other data de-identification ruleset in the group of data de-identification rulesets are satisfied by newly arrived dataset 220. Alternatively, a release of data may be prevented when no defined data de-identification ruleset has conditions satisfied by dataset 220, and de-identification processing may be terminated (e.g., until a proper data de-identification ruleset can be identified based on changing data, etc.) in order to preserve computing resources and efficiency.

Figure 3:
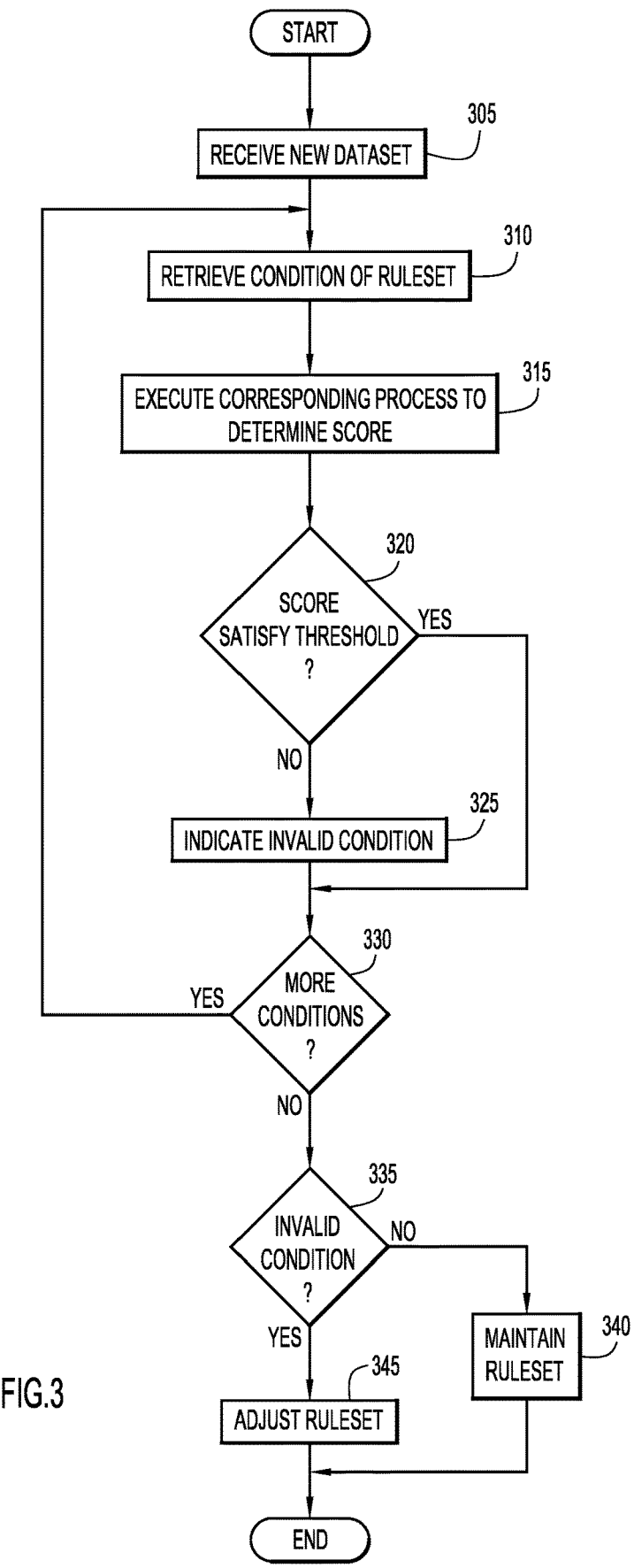
FIG. 3 is a procedural flowchart of a manner of evaluating conditions of a data de-identification ruleset according to an embodiment of the present invention.

A manner of evaluating conditions for dataset 220 (e.g., corresponding to flow 240 of FIG. 2) according to an embodiment of the present invention is illustrated in FIG. 3. Initially, an active data de-identification ruleset 225 and corresponding conditions 230 are enforced for dataset 210. New dataset 220 is received at step 305, preferably in a streaming fashion. A condition 230 of active data de-identification ruleset 225 is retrieved at step 310, and a corresponding condition evaluation process to evaluate the condition is executed at step 315. The condition evaluation process preferably determines a numerical value or score indicating compliance with the condition. The numerical score and evaluation varies based upon the type of condition 230.

For example, in the case of a condition 230 pertaining to a triangulation attack, a matching score may be determined that represents a probability of a successful triangulation attack. Dataset 220 may be de-identified according to data de-identification rules of active data de-identification ruleset 225. The matching score may be based on linkages between de-identified records from dataset 220 and an external dataset (e.g., census data, yellow pages, deaths reported in obituaries, open data, etc.). When a linkage exists, this indicates that an identity of an individual of the de-identified dataset may be determined, thereby identifying a privacy vulnerability with respect to the data de-identification based on active data de-identification ruleset 225. A quantity or percentage of successful linkages between data records of the de-identified dataset and external datasets may be compared against an acceptable threshold (e.g., specified in corresponding condition 230) at step 320 to indicate a likelihood of performing a successful re-identification attack against data de-identification based on the active data de-identification ruleset.

The numerical score may be based on computation of statistics from external datasets that correspond to evaluation of population uniqueness criteria (e.g., information about population density in certain geolocations, etc.) when condition 230 pertains to this type of data characteristic. This score may be compared to acceptable bounds defined in corresponding condition 230 for active data de-identification ruleset 225 at step 320 to indicate compliance with that condition. The acceptable bounds may pertain to deviations from similar statistics computed when data de-identification rules of active data de-identification ruleset 225 were established.

When condition 230 pertains to data sensitivity, the numerical score may be based on quantification of correlations existing between attributes of dataset 220. These correlations may give rise to sensitive information disclosure attacks and enable indirect re-identifications (e.g., when a data value is missing or an outlier). For example, the numerical score may represent a quantity of quasi-identifiers introduced into the de-identified dataset. The quasi-identifiers may be identified in a de-identified dataset based on any conventional or other techniques. For example, uniqueness of entities identified by groups of attributes within the de-identified dataset may be utilized to determine quasi-identifiers, regular expressions or patterns may be used to identify known identifiers, etc. The numerical score may be compared to a threshold (e.g., specified in corresponding condition 230) at step 320 to indicate compliance with that condition.

Condition 230 may pertain to data distributions, where the numerical score may be based on calculation of changes to data distributions between dataset 210 and dataset 220 (e.g., the population distribution used in the data analysis that led to the expert determination, the data distribution of dataset 220 that was evaluated for protection, etc.). The numerical score or change in data distribution may be compared to a threshold (e.g., specified in corresponding condition 230) at step 320 to indicate compliance with that condition.

When the numerical score for condition 230 does not satisfy the corresponding threshold as determined at step 320 (indicating non-compliance with the condition), condition 230 is marked or flagged as invalid at step 325. When additional conditions for active data de-identification ruleset 225 exist as determined at step 330, the next condition is retrieved at step 310 and evaluated as described above.

Once each condition of active data de-identification ruleset 225 has been processed, the presence of an invalid condition is determined at step 335. When each condition is satisfied, active data de-identification ruleset 225 is maintained at step 340. If at least one condition is indicated as invalid, active data de-identification ruleset 225 is provided to rule module 120 for modification or replacement at step 345.

Figure 4:
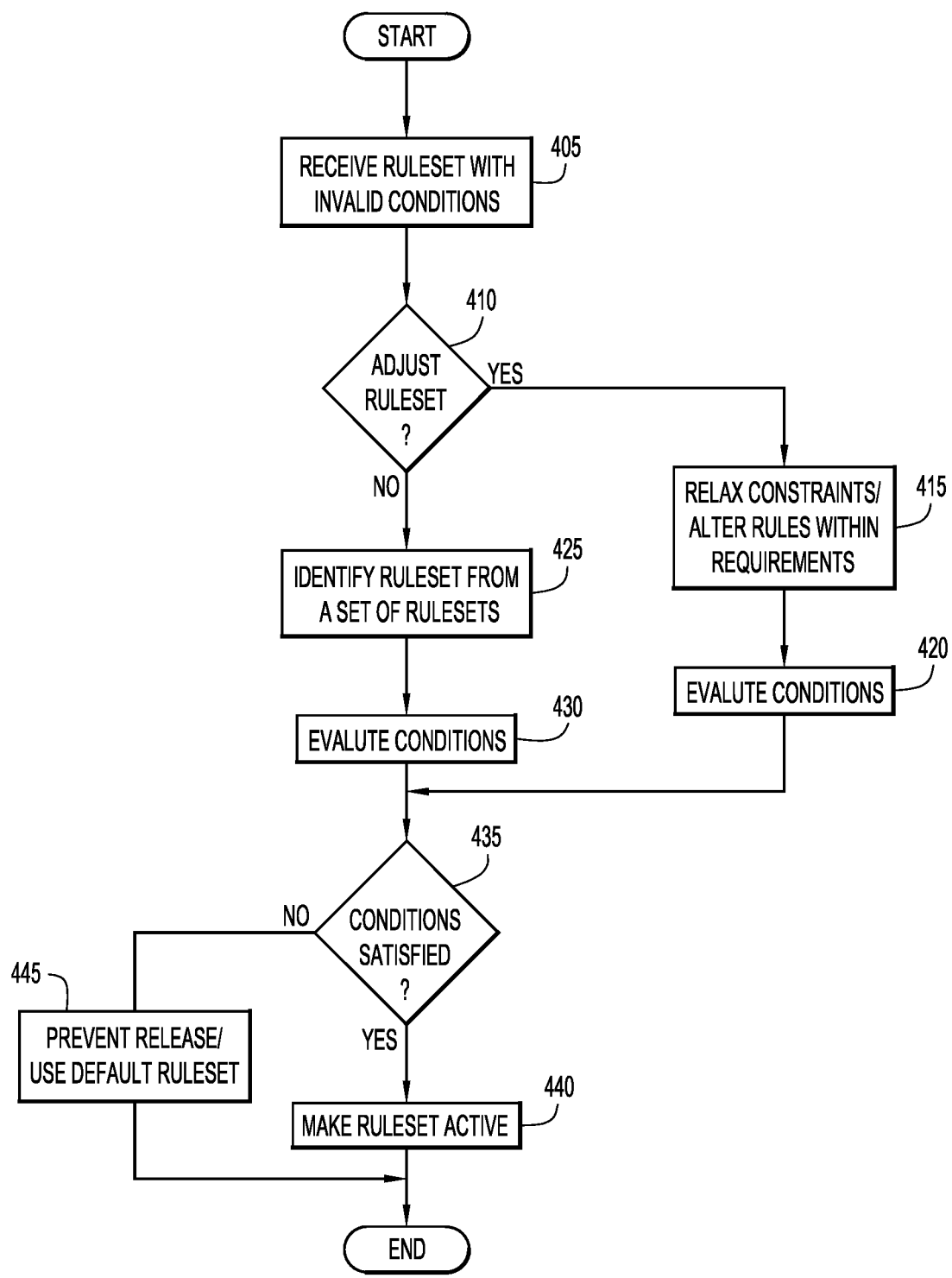
FIG. 4 is a procedural flowchart of a manner of adjusting a data de-identification ruleset according to an embodiment of the present invention.

A manner of adjusting an active data de-identification ruleset (e.g., corresponding to flow 250 of FIG. 2) according to an embodiment of the present invention is illustrated in FIG. 4. Specifically, active data de-identification ruleset 225 with invalid conditions is retrieved at step 405. The data de-identification ruleset may be modified or replaced with a new data de-identification ruleset based on various parameters (e.g., user preferences, configuration parameters, etc.). When the active data de-identification ruleset is to be modified as determined at step 410, the various data de-identification rules and/or conditions may be adjusted for new dataset 220 to comply with the conditions at step 415. The adjustments are restricted to those within the limits of any data de-identification requirements (e.g., of laws, policies, standards, etc.).

For example, statistics and/or characteristics of new dataset 220 and external datasets may be determined to provide a state of the new dataset. These characteristics and/or statistics may include those described above for the evaluation. Data de-identification rules of the active data de-identification ruleset may be adjusted based on the determined state. By way of example, a data de-identification rule may de-identify or generalize a date of birth attribute to month and year. When the original data de-identification rule does not satisfy a corresponding condition (e.g., linkage to external datasets within prescribed limits), the data de-identification rule may be modified to provide further de-identification or suppression to enable satisfaction of the condition (e.g., de-identify or generalize date of birth to year, etc.).

Further, corresponding conditions and/or thresholds of the active data de-identification ruleset may be altered or relaxed based on the statistics and/or characteristics (and within limits of data de-identification requirements). In one case, a modified de-identification ruleset may be enforced based on a delta change ($\delta$) to a threshold ($\theta$) of a data de-identification rule belonging to the active data de-identification ruleset (e.g., $\theta+\delta$) (instead of conformance to a strictly specified threshold in the new data de-identification ruleset). For example, a quantity of external links to external datasets for the date of birth attribute may be increased to acceptable limits of the data de-identification requirements to relax the condition. Further, thresholds may be adjusted based on the delta change identified during evaluation of the conditions.

The modification to the active data de-identification ruleset may be limited to the invalid conditions and associated data de-identification rules in order to reduce processing time. However, any data de-identification rules and/or conditions of the data de-identification ruleset may be modified.

The data de-identification rules and/or conditions of the active data de-identification ruleset may be modified based on machine learning. In this case, data de-identification rulesets and modifications, conditions, thresholds, data de-identifications, data de-identification requirements, and/or data characteristics and/or statistics may be stored. This information may be processed to learn data de-identification ruleset (or data de-identification) modifications (e.g., data de-identification rule modifications, threshold modifications, condition modifications, etc.). Various models may be employed to perform the learning (e.g., neural networks, mathematical/statistical models, classifiers, etc.).

The modified data de-identification ruleset is evaluated (e.g., by evaluation module 120) at step 420 as described above to ensure each condition is satisfied.

When a new data de-identification ruleset is to be identified to replace the active data de-identification ruleset as determined at step 410, the group of predetermined (or user-provided) data de-identification rulesets is examined to identify a new data de-identification ruleset at step 425. This may be accomplished by initially determining statistics and/or characteristics of new dataset 220 and external datasets to provide a state of the new dataset. These characteristics and/or statistics may include those described above for the evaluation. Data de-identification rulesets with more relaxed requirements of the invalid conditions may be identified based on the determined state, and the conditions of the identified data de-identification ruleset is evaluated against dataset 220 at step 430. Alternatively, each of the data de-identification rulesets in the group may be evaluated (e.g., by evaluation module 116) against the new dataset (and determined state) at step 430 as described above to identify a data de-identification ruleset with each condition satisfied.

In addition, the new data de-identification ruleset may be identified based on machine learning. In this case, data de-identification rulesets and modifications, conditions, thresholds, data de-identifications, data de-identification requirements, and/or data characteristics and/or statistics may be stored. This information may be processed to learn data de-identification rulesets (or data de-identifications) to identify based on the determined state of the new dataset. Various models may be employed to perform the learning (e.g., neural networks, mathematical/statistical models, classifiers, etc.).

When conditions of a modified or identified data de-identification ruleset are satisfied, the data de-identification ruleset is made active and utilized for data de-identification at step 440. The rule module may further generate and provide one or more notifications to the data owner when the active data de-identification ruleset is no longer applicable to indicate replacement by a modified (e.g., rules and/or conditions) or new data de-identification ruleset. A data de-identification ruleset identification (e.g., a CertificateID, etc.) may be updated to indicate the modified or new data de-identification ruleset, and used for auditing purposes.

When a data de-identification ruleset cannot be modified or identified to satisfy the conditions for dataset 220, a default data de-identification ruleset may be employed at step 445 for data de-identification. Alternatively, release of data may be prevented when no data de-identification ruleset can be produced to satisfy the conditions in order to prevent a privacy breach, and de-identification processing may be terminated (e.g., until a proper data de-identification ruleset can be identified based on changing data, etc.) in order to preserve computing resources and efficiency.

Figure 5:
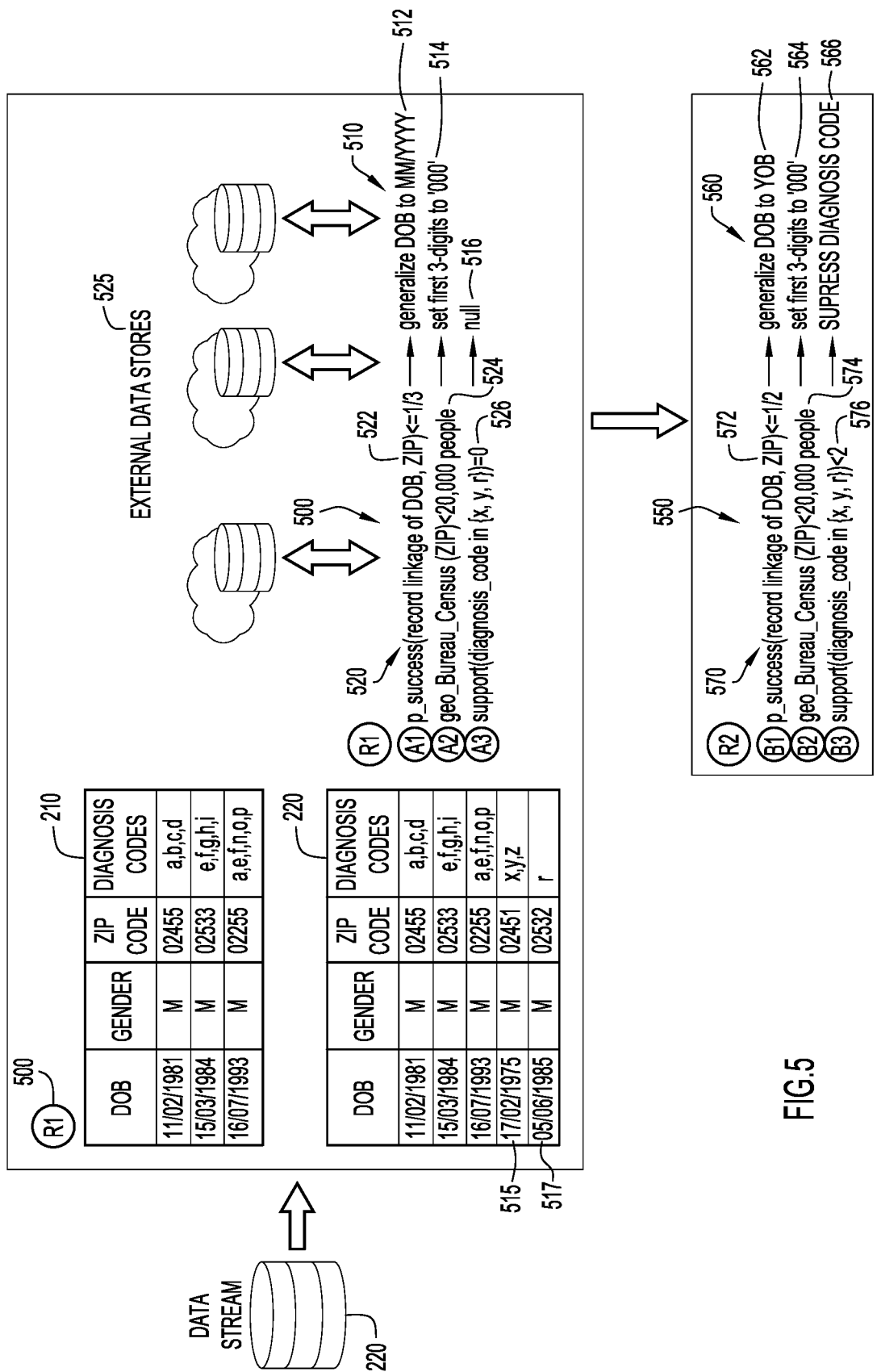
FIG. 5 is a diagrammatic illustration of an example of dynamically adjusting data de-identification according to an embodiment of the present invention.

An example of dynamically adjusting data de-identification based on changing data is illustrated in FIG. 5. Initially, dataset 210 may be in the form of a table with each row corresponding to an individual or entity and columns specifying attributes of date of birth (DOB), gender, zip code, and diagnosis codes. A data de-identification ruleset 500 is currently active for de-identifying dataset 210. The data de-identification ruleset includes rules 510 specifying manners of data de-identification in accordance with data de-identification requirements (e.g., of laws, policies, standards, etc.) and conditions 520 indicating the conditions when rules 510 are applied to de-identify data. Conditions 520 reflect a state of a dataset (e.g., data characteristics and/or statistics, etc.) when rules 510 were established so that the rules de-identify the dataset in compliance with the data de-identification requirements. When the conditions are no longer satisfied, the data de-identification provided by the data de-identification rules may not comply with the data de-identification requirements.

By way of example, rules 510 may include a rule 512 to de-identify or generalize the date of birth of individuals to the corresponding month and year, a rule 514 to mask the initial three digits of zip code to "000", and a rule 516 which basically provides no data de-identification for the diagnosis codes. By way of further example, conditions 520 may include a condition 522 requiring the probability of successful linkage of de-identified data to data of external data stores 525 to be less than or equal to one out of three (or 33.3%), a condition 524 requiring less than 20,000 individuals to reside in the zip code based on the most recent census data, and a condition 526 requiring that the dataset contains no diagnosis (ICD) codes x, y, or r. When these conditions are satisfied, the rules provide data de-identification in compliance with the data de-identification requirements.

As dataset 210 evolves, dataset 220 is produced which includes additional rows or records 515, 517 with diagnosis codes of x, y, z (row 515) and r (row 517). When evaluation of conditions 520 occurs for active data de-identification ruleset 500, at least condition 526 (e.g., specifying no diagnosis codes x, y, or r exist in the data) is no longer satisfied. Accordingly, a new data de-identification ruleset 550 is identified having conditions satisfied by dataset 220. The new data de-identification ruleset may be a modified version of data de-identification ruleset 500, or be a new data de-identification ruleset identified from a group of predetermined (or user-provided) data de-identification rulesets known to comply with data de-identification requirements (under prescribed conditions indicated in the data de-identification rulesets).

By way of example, data de-identification ruleset 550 may include rules 560 and conditions 570. Rules 560 specify manners of data de-identification in accordance with data de-identification requirements (e.g., of laws, policies, standards, etc.) and conditions 570 indicate the conditions when rules 560 are applied to de-identify data. Rules 560 may include a rule 562 to de-identify or generalize the date of birth to the corresponding year, a rule 564 to mask the initial three digits of zip codes to "000", and a rule 566 which suppresses diagnosis codes. By way of further example, conditions 570 may include a condition 572 requiring the probability of successful linkage of de-identified data to data of external data stores 525 to be less than or equal to one out of two (or 50%), a condition 574 requiring less than 20,000 individuals to reside in the zip code based on the most recent census data, and a condition 576 requiring less than two occurrences of diagnosis (ICD) codes x, y, or r in the dataset. When data de-identification ruleset 550 is enforced, each occurrence of diagnosis codes x, y, or r, will be suppressed in the data unless there exist at least two individuals that have the corresponding diagnosis (ICD) code.

The new data de-identification ruleset 550 changes de-identification of date of birth (e.g., from month and year to year) and diagnosis codes (e.g., from no de-identification to suppression of selected diagnosis codes), and the corresponding conditions (e.g., linkage of date of birth from one out of three to one out of two, and occurrences of diagnoses codes of x, y, or r from no occurrences to less than two occurrences). These changes dynamically adapt the data de-identification to satisfy the conditions and provide sufficient de-identification for new dataset 220 to comply with the de-identification requirements.

Data de-identification ruleset 550 is made active for de-identifying the data. New changes to the dataset may similarly be monitored and data de-identification ruleset 550 evaluated in substantially the same manner described above. When one or more conditions 570 of active data de-identification ruleset 550 are no longer satisfied, the active data de-identification ruleset may be modified or replaced in accordance with the changing data.

It will be appreciated that the embodiments described above and illustrated in the drawings represent only a few of the many ways of implementing embodiments for adaptive statistical data de-identification based on evolving data streams.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, evaluation module, rule module, de-identification processes, condition evaluation processes, etc.). These systems may include any types of monitors and input devices (e.g., keyboard, mouse, voice recognition, etc.) to enter and/or view information.

It is to be understood that the software (e.g. evaluation module, rule module, de-identification processes, condition evaluation processes, etc.) of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., evaluation module, rule module, de-identification processes, condition evaluation processes, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., original and changed datasets, thresholds, data de-identification rulesets, etc.). The database system may be implemented by any number of any conventional or other databases, data stores or storage structures (e.g., files, databases, data structures, data or other repositories, etc.) to store the information. The database system may be included within or coupled to the server and/or client systems. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information (e.g., recommended data de-identification rulesets, de-identified datasets, invalid conditions, data de-identification ruleset evaluation results, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The report may include any information arranged in any fashion, and may be configurable based on rules or other criteria to provide desired information to a user (e.g., recommended data de-identification rulesets, de-identified datasets, invalid conditions, data de-identification ruleset evaluation results, etc.).

The present invention embodiments are not limited to the specific tasks or algorithms described above, but may be utilized for dynamically adapting any type of de-identification for any data based on any data changes for any desired applications, industries, and/or requirements. The rulesets may include any quantity of any types of rules for any types of data de-identification. The data de-identification may comply with any types of any requirements (e.g., laws, policies, standards, particular industries, applications, and/or scenarios, etc.). The rulesets may include any quantity of any types of conditions for applying the ruleset.

The thresholds for the conditions may be set to any desired values (e.g., a quantity or percentage of links, a quantity of quasi-identifiers, etc.). The numerical value or score may be of any desired values or in any value ranges, and may be compared to the thresholds in any desired manner (e.g., greater than, less than, greater than or equal to, less than or equal to, etc.). Any quantity of one or more conditions may no longer be satisfied in order to initiate a ruleset change or replacement. The data may be checked continuously (e.g. in real time) or at any desired periodic or other time intervals to evaluate the ruleset conditions. Any types or changes in the dataset or any changes to dataset statistics and/or characteristics may be utilized to initiate a ruleset evaluation.

The rules and/or conditions of a ruleset may be modified in any fashion based on changing data. Further, a ruleset from the group of rulesets may be identified in any fashion. For example, the ruleset satisfying all, or the most, conditions may be automatically selected and/or recommended (e.g., for user selection).

The datasets may be evaluated against any types of known or other datasets (e.g., user provided datasets, publicly available datasets, internal organization datasets, etc.). Any quantity of any types of rulesets may be initially provided by any type of user to cover any data de-identification requirements and data characteristics.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of dynamically changing a data de-identification ruleset applied to a dataset for de-identifying data to transform values of the dataset to protect sensitive information comprising:
monitoring over time a dataset including a plurality of attributes via a processor, wherein the dataset changes over time and is derived from data that is de-identified according to a data de-identification ruleset under a set of conditions, and wherein the data de-identification ruleset indicates one or more manners of de-identifying data to suppress a first amount of information within each of one or more corresponding attributes of the dataset;
determining, via the processor, when changes in the monitored dataset satisfy a quantity of changes;
evaluating, via the processor, the set of conditions for the data de-identification ruleset with respect to the monitored dataset when the changes in the monitored dataset satisfy the quantity of changes and determining that one or more conditions of the set of conditions for the data de-identification ruleset are no longer satisfied due to the changes in the monitored dataset; and
dynamically changing, via the processor, one or more rules of the data de-identification ruleset to change the one or more manners of de-identifying data to apply at least one different manner of de-identifying data to at least one corresponding attribute of the dataset to suppress a second amount of information within each of the at least one corresponding attribute greater than the first amount of information and provide de-identified data satisfying each condition of the set of conditions.

2. The method of claim 1, wherein evaluating the set of conditions comprises one or more from a group of:
performing triangulation attacks of the monitored dataset against one or more external datasets to indicate a probability of successful re-identification;
retrieving statistics from publicly available and other external datasets to derive population density and population uniqueness criteria;
evaluating correlations between attributes of the monitored dataset based on the monitored dataset or knowledge from external datasets that indicate indirect re-identification; and
determining changes to data distribution that affect the data de-identification ruleset.

3. The method of claim 1, further comprising:
generating a first notification of the change to the one or more rules of the data de-identification ruleset to notify a data owner, and a second notification of transit to another data de-identification ruleset whose conditions are currently satisfied.

4. The method of claim 1, wherein dynamically changing one or more rules of the data de-identification ruleset further comprises:
replacing the data de-identification ruleset with a new data de-identification ruleset selected from among a group of data de-identification rulesets based on the evaluation, wherein conditions of the new data de-identification ruleset are satisfied.

5. The method of claim 4, wherein replacing the data de-identification ruleset further comprises:
replacing the data de-identification ruleset with the new data de-identification ruleset in response to a change in a threshold of a data de-identification rule in the data de-identification ruleset.

6. The method of claim 4, further comprising:
preventing release of the monitored dataset in response to the evaluation indicating one or more conditions for each data de-identification ruleset of the group are not satisfied.

7. The method of claim 1, wherein dynamically changing one or more rules of the data de-identification ruleset further comprises:
changing one or more conditions of the data de-identification ruleset to enable each of the conditions to be satisfied.

8. The method of claim 1, wherein dynamically changing one or more rules of the data de-identification ruleset further comprises:
dynamically changing one or more rules of the data de-identification ruleset based on machine learning.

9. A system for dynamically changing a data de-identification ruleset applied to a dataset for de-identifying data to transform values of the dataset to protect sensitive information comprising:
at least one processor configured to:
monitor over time a dataset including a plurality of attributes, wherein the dataset changes over time and is derived from data that is de-identified according to a data de-identification ruleset under a set of conditions, and wherein the data de-identification ruleset indicates one or more manners of de-identifying data to suppress a first amount of information within each of one or more corresponding attributes of the dataset;
determine when changes in the monitored dataset satisfy a quantity of changes;
evaluate the set of conditions for the data de-identification ruleset with respect to the monitored dataset when the changes in the monitored dataset satisfy the quantity of changes and determine that one or more conditions of the set of conditions for the data de-identification ruleset are no longer satisfied due to the changes in the monitored dataset; and
dynamically change one or more rules of the data de-identification ruleset to change the one or more manners of de-identifying data to apply at least one different manner of de-identifying data to at least one corresponding attribute of the dataset to suppress a second amount of information within each of the at least one corresponding attribute greater than the first amount of information and provide de-identified data satisfying each condition of the set of conditions.

10. The system of claim 9, wherein evaluating the set of conditions comprises one or more from a group of:
performing triangulation attacks of the monitored dataset against one or more external datasets to indicate a probability of re-identification;
retrieving statistics from publicly available datasets to derive population density and population uniqueness criteria;
evaluating correlations between attributes of the monitored dataset based on the monitored dataset or knowledge from external datasets that indicate indirect re-identification; and
determining changes to data distribution that affect the data de-identification ruleset.

11. The system of claim 9, wherein the at least one processor is further configured to:
   generate a first notification of the change to the one or more rules of the data de-identification ruleset to notify a data owner, and a second notification of transit to another data de-identification ruleset whose conditions are currently satisfied.

12. The system of claim 9, wherein dynamically changing one or more rules of the data de-identification ruleset further comprises:
   replacing the data de-identification ruleset with a new data de-identification ruleset selected from among a group of data de-identification rulesets based on the evaluation, wherein conditions of the new data de-identification ruleset are satisfied.

13. The system of claim 12, wherein replacing the data de-identification ruleset further comprises:
   replacing the data de-identification ruleset with the new data de-identification ruleset in response to a change in a threshold of a data de-identification rule in the data de-identification ruleset.

14. The system of claim 12, wherein the at least one processor is further configured to:
   prevent release of the monitored dataset in response to the evaluation indicating one or more conditions for each data de-identification ruleset of the group are not satisfied.

15. The system of claim 9, wherein dynamically changing one or more rules of the data de-identification ruleset further comprises:
   changing one or more conditions of the data de-identification ruleset to enable each of the conditions to be satisfied.

16. The system of claim 9, wherein dynamically changing one or more rules of the data de-identification ruleset further comprises:
   dynamically changing one or more rules of the data de-identification ruleset based on machine learning.

17. A computer program product for dynamically changing a data de-identification ruleset applied to a dataset for de-identifying data to transform values of the dataset to protect sensitive information, the computer program product comprising one or more computer readable storage media collectively having computer readable program code embodied therewith, the computer readable program code executable by at least one processor to cause the at least one processor to:
   monitor over time a dataset including a plurality of attributes, wherein the dataset changes over time and is derived from data that is de-identified according to a data de-identification ruleset under a set of conditions, and wherein the data de-identification ruleset indicates one or more manners of de-identifying data to suppress a first amount of information within each of one or more corresponding attributes of the dataset;
   determine when changes in the monitored dataset satisfy a quantity of changes;
   evaluate the set of conditions for the data de-identification ruleset with respect to the monitored dataset when the changes in the monitored dataset satisfy the quantity of changes and determine that one or more conditions of the set of conditions for the data de-identification ruleset are no longer satisfied due to the changes in the monitored dataset; and
   dynamically change one or more rules of the data de-identification ruleset to change the one or more manners of de-identifying data to apply at least one different manner of de-identifying data to at least one corresponding attribute of the dataset to suppress a second amount of information within each of the at least one corresponding attribute greater than the first amount of information and provide de-identified data satisfying each condition of the set of conditions.

18. The computer program product of claim 17, wherein evaluating the set of conditions comprises one or more from a group of:
   performing triangulation attacks of the monitored dataset against one or more external datasets to indicate a probability of re-identification;
   retrieving statistics from publicly available datasets to derive population density and population uniqueness criteria;
   evaluating correlations between attributes of the monitored dataset based on the monitored dataset or knowledge from external datasets that indicate indirect re-identification; and
   determining changes to data distribution that affect the data de-identification ruleset.

19. The computer program product of claim 17, wherein the computer readable program code is further configured to cause the at least one processor to:
   generate a first notification of the change to the one or more rules of the data de-identification ruleset to notify a data owner, and a second notification of transit to another data de-identification ruleset whose conditions are currently satisfied.

20. The computer program product of claim 17, wherein dynamically changing one or more rules of the data de-identification ruleset further comprises:
   replacing the data de-identification ruleset with a new data de-identification ruleset selected from among a group of data de-identification rulesets based on the evaluation, wherein conditions of the new data de-identification ruleset are satisfied.

21. The computer program product of claim 20, wherein replacing the data de-identification ruleset further comprises:
   replacing the data de-identification ruleset with the new data de-identification ruleset in response to a change in a threshold of a data de-identification rule in the data de-identification ruleset.

22. The computer program product of claim 20, wherein the computer readable program code is further configured to cause the at least one processor to:
   prevent release of the monitored dataset in response to the evaluation indicating one or more conditions for each data de-identification ruleset of the group are not satisfied.

23. The computer program product of claim 17, wherein dynamically changing one or more rules of the data de-identification ruleset further comprises:
   changing one or more conditions of the data de-identification ruleset to enable each of the conditions to be satisfied.

24. The computer program product of claim 17, wherein dynamically changing one or more rules of the data de-identification ruleset further comprises:
   dynamically changing one or more rules of the data de-identification ruleset based on machine learning.

* * * * *